(12) United States Patent
Zhang et al.

(10) Patent No.: US 7,827,384 B2
(45) Date of Patent: Nov. 2, 2010

(54) GALOIS-BASED INCREMENTAL HASH MODULE

(75) Inventors: Ming Zhang, San Jose, CA (US);
Jui-Yang Lu, Fremont, CA (US);
Jonathan J. Chang, Cupertino, CA (US); Stephanie W. Ti, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 578 days.

(21) Appl. No.: 11/778,151

(22) Filed: Jul. 16, 2007

(65) Prior Publication Data
US 2009/0024826 A1    Jan. 22, 2009

(51) Int. Cl.
*G06F 12/00*    (2006.01)

(52) U.S. Cl. .................................................... 711/216
(58) Field of Classification Search .................. None
See application file for complete search history.

(56) References Cited

PUBLICATIONS

Bellare, et al., "Incremental Cryptography and Application to Virus Protection," Abstract appearing in Proceedings of the 27$^{th}$ ACM Symposium on the Theory of Computing, May 1995, pp. 1-15.

*Primary Examiner*—Hiep T Nguyen
(74) *Attorney, Agent, or Firm*—Campbell Stephenson LLP

(57) ABSTRACT

Various systems and methods for implementing a Galois-based incremental hash module are disclosed. For example, a method involves computing a first hash of a first string of an input stream. The first hash is computed by performing one or more Galois mathematical operations upon portions of the first string. A second hash of a second string, which overlaps the first string, can then be computed by processing the first hash.

20 Claims, 7 Drawing Sheets

GALOIS-BASED INCREMENTAL HASH MODULE

FIELD OF THE INVENTION

This invention relates to hash functions and, more particularly, to incremental hash functions.

DESCRIPTION OF RELATED ART

Various devices use hash functions to search for patterns within input streams. For example, devices such as Bloom filters use hash functions to determine whether a stream of text contains certain known patterns or signatures. Bloom filters can be used to detect viruses and worms, to detect plagiarism, and to perform other types of pattern detection.

Hash functions operate by computing a value based on upon a larger set of data (e.g., a number representing a string of text). The resulting value, or hash, is typically much smaller than the larger number from which the hash is computed. A hash is reproducible, such that when the same input is processed by the same hash function, the same hash will result. Desirable hash function features include collision resistance, which means that the hash function is very unlikely to generate the same hash for different inputs, and uniformity, which means that the hashes generated by the hash function are distributed evenly.

When hash functions are used to search for patterns that can begin anywhere within an input stream (as in often the case in applications such as virus detection), the hash function needs to be computed at each possible offset (i.e., each place within the input stream at which the pattern could begin) within the input stream. For example, assume an input stream ABCDE, where each letter represents a unit (e.g., a byte) of data. If the pattern being searched for is four units long, two hashes (one of ABCD and the other of BCDE) need to be calculated.

When the input stream is relatively long and the pattern is relatively short, an undesirably large number of hashes need to be computed. At the same time, improvements in other technologies (e.g., such as network speeds) may make it necessary for the hashes to be computed at ever-increasing speeds. The speed concerns often makes it necessary for the hash functions to be implemented in hardware, which in turn creates concerns about the amount of resources and/or area (e.g., of an integrated circuit) consumed by the hardware used to implement the hash function, especially when a large number of hashes need to be computed per input stream. Accordingly, it is desirable to identify hash functions that are both efficient when generating hashes at different offsets within an input stream and efficient in terms of resource and area consumption.

DESCRIPTION OF THE DRAWINGS

A more complete understanding of the present invention may be acquired by referring to the following description and the accompanying drawings, in which like reference numbers indicate like features.

Figures 1, 2:
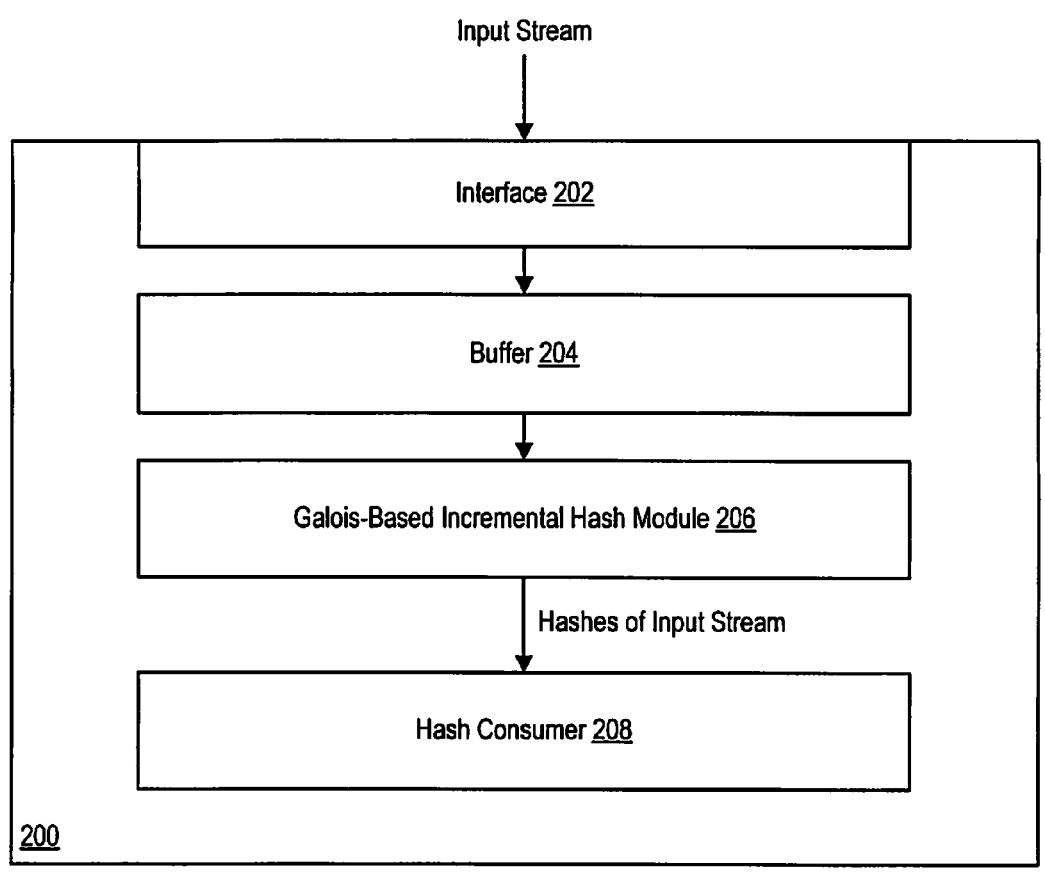
FIG. 1 shows an example of an input stream that can be processed according to one embodiment of the present invention.
FIG. 2 is a diagram of a device that generates a hash of an input stream using a Galois-based incremental hash module, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A Galois-based incremental hash module can be used to quickly and efficiently perform incremental hash calculations. The Galois-based incremental hash module includes the functionality to perform Galois mathematical operations, such as Galois multiplication and addition, upon portions of an incoming input stream in order to generate one or more hashes of substrings within the input stream. The Galois-based incremental hash module can generate a hash of a second substring based upon the hash of a first substring.

FIG. 1 shows an example of an input stream that can be processed by a Galois-based incremental hash module. As shown, the input stream includes n bytes, Byte 0-Byte n−1. In this example, the bytes are numbered in sequential order, such that Byte 0 is the first byte of the input stream and Byte n−1 is the final byte.

It can be desirable to generate hashes of a variety of different substrings within the input stream. Such hashes can be used to detect particular patterns or content within the input stream (e.g., in order to detect whether the input stream contains malicious or erroneous content). For example, it can be desirable to generate hashes of 8-byte long substrings beginning at every byte offset within the string in order to verify that a particular 8-byte (or longer) worm is not included in the input stream. Accordingly, a hash can be generated of the substring containing Bytes 0-7, another hash can be generated of the substring containing bytes 1-8, and so on. Similarly, if it is desirable to generate a hash of 48-byte substrings beginning at every fourth byte offset, hashes can be generated for the substrings containing Bytes 0-47, Bytes 4-51, and so on.

Incremental hash functions, which effectively reuse values used to generate a hash of a substring beginning at one offset when generating the hash of the substring beginning at the next offset, are very efficient in applications such as these. For example, assume an input stream ABCDE, where each letter represents a unit (e.g., a byte) of data. If the pattern being searched for is four units long, an incremental hash function can be used to generate hashes at two offsets, such that the first hash is the hash of the first four bytes ABCD and the second hash is the hash of the second four bytes BCDE. An incremental hash function can reuse computations performed when generating the first hash when calculating the second hash.

In order to efficiently (e.g., in terms of area consumed by hardware implementations and/or time taken to complete calculations) calculate an incremental hash, an incremental hash module can be implemented using Galois multipliers and adders, as described herein. The use of these Galois-based components, instead of normal multipliers and adders, can result in improved efficiencies.

In one embodiment, a Galois-based incremental hash module implements the following hash equation to generate a hash V0 of a substring S0. In this equation, S0 is a substring of n units (e.g., bytes) within an input stream, and $S0=\{s_0, s_1, \ldots s_{n-2}, s_{n-1}\}$, where each $s_i$ contains w consecutive bits from S0. The last $s_i$, $s_{n-1}$, may contain less than w bits, and thus the Galois-based incremental hash module can right pad $s_{n-1}$ with fixed values (e.g., zero or one) until $s_{n-1}$ contains a full w bits.

$$V0 = H(S0) = s_0 * k^n + \ldots + s_{n-3} * k^3 + s_{n-2} * k^2 + s_{n-1} * k. \quad \text{Eq. 1}$$

In the above equation, + and * are modular operations, and k is a w-bit non-zero number. It is noted that, because Galois field operations are being used, each term in the equation is implicitly a modulo p term (e.g., in the above equation, $s_0 * k^n$ can be rewritten as $s_0 * k^n \mod p$, and so on), where p is the irreducible polynomial of degree w associated with the Galois field $GF(2^w)$. For simplicity, Equation 1 (and subsequent equations) omits this modulo p term.

It is noted that the above equation can be implemented using only Galois multiplication and addition operations (i.e., no conventional multiplication or addition is needed). Furthermore, each term in the above equation is multiplied by a respective power of the constant k. In particular, each term in the equation is generated by multiplying (using Galois multiplication) a respective $s_i$ by $k^{n-i}$, and then these terms are summed (using Galois addition) to generate the hash of the substring S0.

As noted above, this hash is incremental, such that if the hash value H(S0) for substring S0 is known, the hash value H(S1) for the next substring $S1=\{s_1, s_{n-1}, \ldots s_n\}$ can be obtained by simply modifying the hash value H(S0) to account for the differences between S0 and S1, as shown by the following equation.

$$V1 = H(S1) = (H(S0) + s_0 * k^n + s_n) * k \quad \text{Eq. 2}$$

As shown in the above equation, generating H(S1) involves modifying the hash H(S0) to account for the fact that S0 includes $s_0$ but not $s_n$ and that S1 includes $s_n$ but not $s_0$. Accordingly, the equation includes a term corresponding to $s_0$ (adding this term effectively removes $s_0$ from the substring represented by the resulting hash) and a term corresponding to $s_n$ (adding this term effectively adds $s_n$ to the substring represented by the resulting hash). As with the first equation, the equation for hash H(S1) can be implemented using only Galois addition and multiplication operations. Furthermore, as in the above equation for H(S0), each $s_i$ term in the H(S1) equation is multiplied by a power of k.

Other equations can be defined to generate incremental hashes at other offsets within the input stream. Examples of such equations are provided below. Additionally, examples of Galois-based incremental hash devices that can implement these or similar equations are provided below.

FIG. 2 is a diagram of a device that generates a hash of an input stream using a Galois-based incremental hash module. As shown, device 200 includes an interface 202 that receives an input stream. The interface can be coupled to a storage device, an input device, a network, or any other source of an input stream. The input stream can represent text, numerical data, images, audio, or any other desired data. The input stream can be temporarily stored in a buffer 204 that is coupled to the interface.

A Galois-based incremental hash module 206 is coupled to receive substrings within the input stream from buffer 204. Alternatively, Galois-based incremental hash module 206 can receive such substrings directly from interface 202. Galois-based incremental hash module 206 is configured to support the generation of incremental hashes using Galois mathematical operations, as described above.

Galois-based incremental hash module 206 can generate one or more hashes of each substring within the input stream and provide those hashes to a hash consumer 208. Hash consumer 208 can process the hashes in order to make various determinations about the input stream. For example, hash consumer 208 can compare the hashes generated by Galois-based incremental hash module 206 to hashes associated with known viruses or worms. If a match is found, hash consumer 208 can determine that the input stream is likely to contain a virus or worm.

In some embodiments, the device of FIG. 2 is a router or other network device (e.g., a switch, a bridge, or the like). In such embodiments, the input stream can be a packet, message, or other datagram that is received via a network. Galois-based incremental hash module 206 and hash consumer 208 can be part of a multi-stage filter (MSF) that is used to detect potentially malicious content within a packet. Such a multi-stage filter can be implemented using a Bloom filter (e.g., hash consumer 208 can be a Bloom filter).

In one such embodiment, Galois-based incremental hash module 206 and hash consumer 208 are used to implement two checks on incoming packets. In the first stage check, Galois-based incremental hash module 206 can be used to generate a hash over each substring of a fixed-size within the input stream. For each hash, hash consumer 208 (e.g., a multi-stage filter) can determine whether the hash indicates that the associated substring has a high probability of containing a particular pattern. If the first stage check indicates that the input stream may contain a particular pattern, a slower and more exhaustive second stage check can be triggered.

Galois-based incremental hash module 206 can also be used to implement a signature learning block. Signature learning takes advantage of the fact that anomalous network traffic (e.g., such as that used to spread worms) typically displays content repetition and address dispersion (the latter results from the number of hosts sending and/or receiving content tending to grow over time). The signature learning block detects the most prevalent invariant strings within the payload of packets, allowing subsequently received packets to be searched for those strings.

One function performed by a signature learning block is signature generation, which can be implemented using Galois-based incremental hash module 206. To facilitate signature generation, Galois-based incremental hash module 206 calculates an incremental hash across substrings (e.g., such substrings can be defined a user or application specifying a programmable-length sliding window in terms of the length and offset of each substring, such as 8-byte long substrings at every fourth byte offset) within the payload of each packet. Galois-based incremental hash module 206 can also calculate a source and/or destination hash value based on address information in the packet's header (e.g., Galois-based incremental hash module 206 can calculate the hash of a source address and/or the hash of a destination address).

In one such embodiment, Galois-based incremental hash module 206 receives the packet payload data at 16 bytes per cycle (the payload data can be accompanied by a valid indication, Start of Packet (SOP) for the first byte in the packet and an End of Packet (EOP) indication for the final byte in a packet, and a packet length, which Galois-based incremental hash module 206 can use to identify one or more substrings within the input stream). For each substring (e.g., as defined by the programmable-length sliding window) within the received data, Galois-based incremental hash module 206 can generate a 56-bit hash according to the Galois-based incremental hash function. For timing reasons, the functionality used to perform the 56-bit hash generation can be subdivided into seven 8-bit hash generation units (e.g., such units can be configured as shown below in FIGS. 4-7) within Galois-based incremental hash module 206. Each of the units can be programmed to use a different value of the constant k (from Equations 1 and 2 above) in their respective calculations, hence generating seven independent 8-bit hashes. These independent 8-bit hashes can then be combined (e.g., by appending the hashes in a prespecified order) to form the 56-bit hash.

Figure 3:
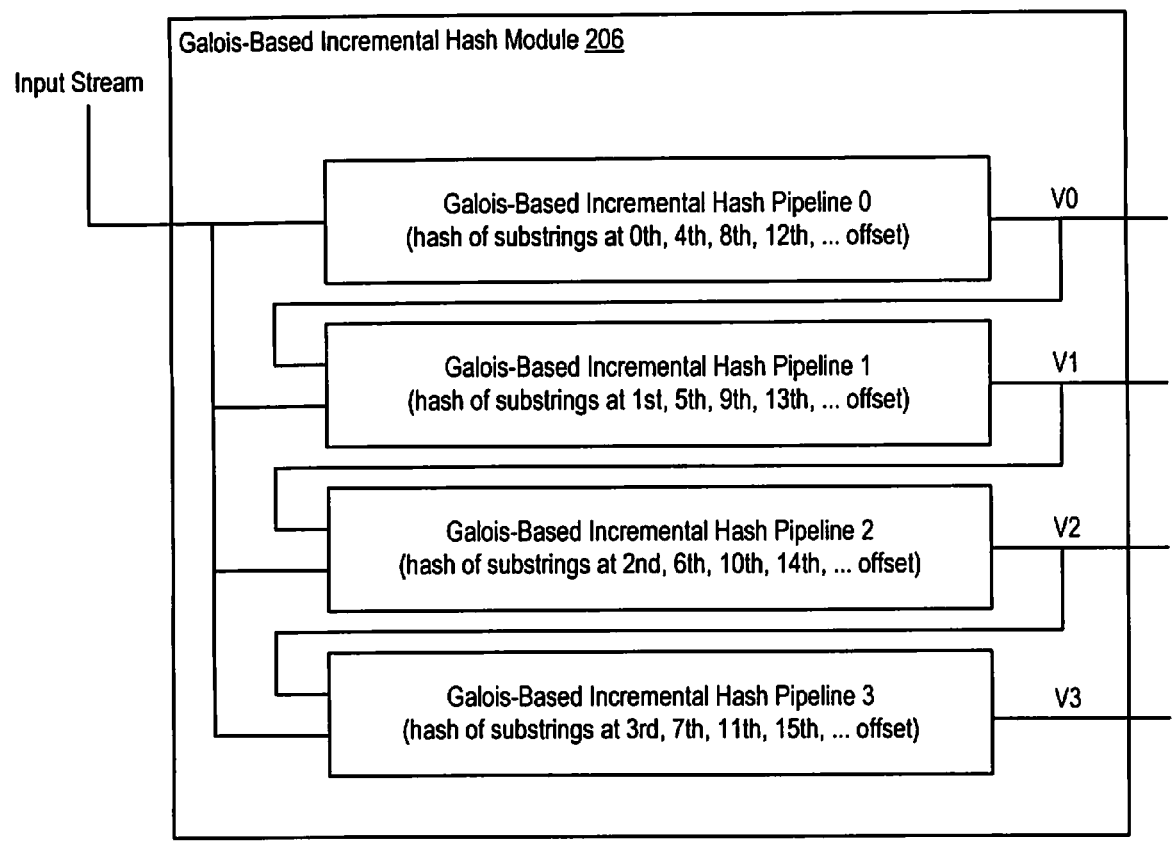
FIG. 3 is a block diagram of a Galois-based incremental hash module used to calculate an incremental hash of an input stream, according to one embodiment of the present invention.

FIG. 3 is a block diagram of a Galois-based incremental hash module used to calculate an incremental hash of an input stream. As shown, Galois-based incremental hash module 206 includes four pipelines, Pipelines 0-3. Each pipeline receives at least a portion of the input stream. Additionally, since this is an incremental hash module, Pipelines 1-3 receive the hash generated by the previous pipeline, such that Pipeline 1 receives hash V0 generated by Pipeline 0, Pipeline 2 receives hash V1 generated by Pipeline 1, and Pipeline 3 receives hash V2 generated by Pipeline 2. Each pipeline x calculates a respective hash Vx, using the following four equations:

$$V0 = H(S0) = s_0 *k^n + \ldots + s_{n-3}*k^3 + s_{n-2}*k^2 + s_{n-1}*k. \quad \text{Eq. 1}$$

$$V1 = H(S1) = (V(0) + s_0*k^n + s_n)*k \quad \text{Eq. 2}$$

$$V2 = H(S2) = (V(1) + s_1 \cdot k^n + s_{n+1})*k \quad \text{Eq. 3}$$

$$V3 = H(S3) = (V(2) + s_2*k^n + s_{n+2})*k \quad \text{Eq. 4}$$

Each equation generates the hash of an n-unit substring within an input stream that contains data units (e.g., bytes) $s_0$, $s_1$, $s_2$, ... V0 is the hash of S0, which contains data units $s_0$-$s_{n-1}$. V1 is the hash of the next substring S1, which contains data units $s_1$-$s_n$. Similarly, V2 is the hash of S2, which contains data units $s_2$-$s_{n+1}$, and V3 is the hash of S3, which contains data units $s_3$-$s_{n+2}$.

In the example of FIG. 3, the datapath of each pipeline is four units wide (this feature is described in more detail below). Accordingly, each pipeline can be used to calculate hashes of substrings that begin at every fourth offset within the input stream. Pipeline 0 can be used to calculate hashes of substrings that begin at the offsets 0, 4, 8, 12, and so on. Similarly, Pipeline 1 can be used to calculate hashes of substrings that begin at offsets 1, 5, 9, 13, and so on; Pipeline 2 is configured to calculate hashes of substrings that begin at offsets 2, 6, 10, 14, and so on; and Pipeline 3 is configured to calculate hashes of substrings that begin at offsets 3, 7, 11, 15, and 20 on. Accordingly, these four pipelines can calculate hashes of substrings beginning at any offset within the input stream.

In alternative embodiments that feature different datapath widths, the offsets handled by each pipeline may be determined differently. For example, if the datapaths are five units wide, each pipeline can generate hashes of substrings that begin at every fifth offset within the input stream. In such an embodiment, five pipelines are needed to calculate hashes of substrings at all offsets within the input stream.

As noted above, each $s_i$ contains w consecutive bits from the input stream. An $s_i$ that contains fewer than w bits can be right-padded with fixed values (e.g., zero or one) until $s_{n-1}$ contains a full w bits. In embodiments in which it is desirable to calculate hashes of substrings at each byte offset, it is efficient to set w=eight (8), since there are eight bits in a byte. If instead it is desirable to calculate hashes of substrings at each half-byte offset, w can be set to four (4). In general, to increase efficiency, w can be selected to correspond to the desired offset.

As noted above, Galois-based incremental hash module 206 calculates hashes of substrings based upon an equation that multiplies each unit of data within the substring by a respective power of a non-zero constant k. In some embodiments, Galois-based incremental hash module 206 is configured to modify the value of k in order to effectively create a new hash function. In one such embodiment, Galois-based incremental hash module 206 includes an interface (e.g., a user interface or an application interface) that allows a user (e.g., either a human operator or an application) to request that k be modified and/or to specify a new value of k. In response to such a request, Galois-based incremental hash module 206 is configured to modify the value of k (e.g., according to a prespecified algorithm, if no new value is provided by the user) and/or to replace the value of k with the specified value. A user can request that k be modified in response to detecting that the current value of k has produced a hash equation that has more collisions that are desirable (e.g., such a situation could occur if k were accidentally set to zero). Alternatively, Galois-based incremental hash module 206 can be configured to monitor for collisions and to modify k in response to detecting an unacceptable number of collisions.

Galois-based incremental hash module 206 can modify k while computation of a hash is ongoing, without needing to first flush the current pipelines and restart computation. In some embodiments, k is modified as part of a "context switch" (e.g., such a switch can occur when switching from calculating a hash for one application to calculating a hash for a different application). In such a situation, Galois-based incremental hash module 206 can save the current settings (e.g., the existing value of k, as well as the current inputs, partial hash values, and the like) of the pipelines before modifying k. To switch back to the earlier context, these saved values can be reloaded.

Figure 4:
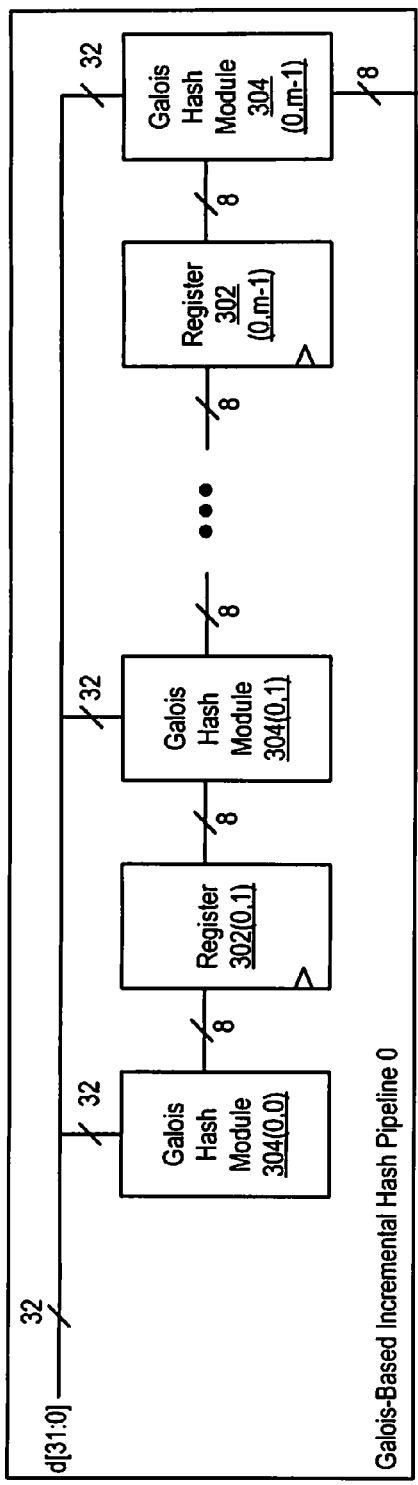
FIG. 4 is a block diagram of a first pipeline that can be included within a Galois-based incremental hash module, according to one embodiment of the present invention.
Figure 5:
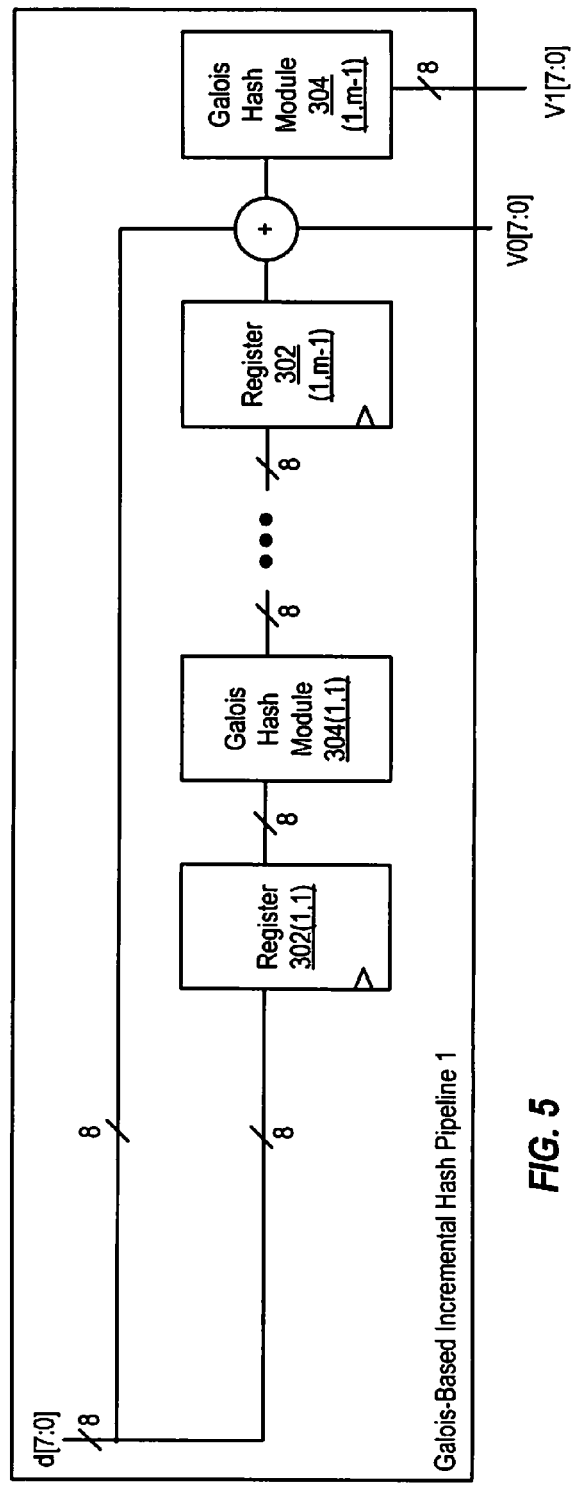
FIG. 5 is a block diagram of a second pipeline that can be included within a Galois-based incremental hash module, according to one embodiment of the present invention.

FIGS. 4-5 provide examples of the functionality that can be included within each pipeline shown in FIG. 3. In FIGS. 4-5, n (the number of units per substring) is set to 64 bytes, and w (the number of bits per unit) is set to eight (8) bits (i.e., one byte). Furthermore, the datapath of each pipeline is four bytes wide. It is noted that these n, w, and datapath width values are provided as examples, and that other embodiments can vary any and/or all of these values.

FIG. 4 shows an example of an implementation of Pipeline 0 from FIG. 3. In this example, Pipeline 0 receives 32 bits of the input stream at a time (i.e., per input cycle), as represented by d[31:0]. Pipeline 0 includes m stages (stage 0-stage m−1), each of which can be implemented using a register and a Galois hash module. For example, the second stage includes register 302(0,1) (the first numeral in parentheses identifies the pipeline and the second numeral identifies the stage) and Galois hash module 304(0,1), and the final stage includes register 302(0,m−1) and Galois hash module 304(0,m−1). The number of stages m is equal to the length of the substring n (in units) for which a hash is being calculated, divided by the datapath width (in the same units). Accordingly, in this example, there are 64/4=16 stages.

In this example, the register has been omitted from the first stage, since there is no previous value. In alternative embodiments, however, the first stage can include a register (e.g., 302(0,0), not shown) that provides an eight-bit value equal to zero to Galois hash module 304(0,0).

Each stage receives the same 32-bit (four byte) input d[31:0]. In a first cycle (Cycle 0), all stages receive the first four bytes of the input stream: $s_0$, $s_1$, $s_2$, and $s_3$. Similarly, in the next cycle (Cycle 1), all stages receive the next four bytes of the input stream: s4, s5, s6, and s7. Since there are 16 stages in this example, it takes 16 cycles to calculate the hash V0 of a 64-byte substring S0. Accordingly, in the mth cycle (Cycle m−1), the desired hash V0 of the 64-byte substring S0 is available at the output of Pipeline 0. Similarly, in the m+1th cycle, the hash of 64-byte substring S4, which begins four bytes after substring S0, will be available as V0.

Each register in Pipeline 0 can be implemented using a flip-flop (e.g., a delay (D) flip-flop or other storage mechanism. Each register can be configured to store a received input in response to a first clock cycle and to output the stored value to the next stage in the pipeline.

Each register receives and stores the partial hash value calculated by the Galois hash module in the previous stage. Accordingly, register 302(0,1) receives the partial hash value calculated by Galois hash module 304(0,0) and register 302(0,m) receives the partial hash value calculated by Galois hash module 304(0, m−1) (not shown).

Each Galois hash module is configured to generate one or more partial hash values. In particular, by the end of a given cycle, the first Galois hash module in Pipeline 0 generates a hash of the substring d[31:0] that is input to Pipeline 0 in that cycle. For example, in a first cycle (Cycle 0), the first Galois hash module 304(0,0) can calculate the hash of the substring $\{s_0, s_1, s_2, s_3\}$. The second Galois hash module 304(0,1) in Pipeline 0 generates a hash of the substring formed by concatenating the value of d[31:0] that was input to Pipeline 0 in the previous cycle with the value of d[31:0] that is currently being input to Pipeline 0. For example, in a second cycle (Cycle 1), the second Galois hash module can calculate the hash of the substring $\{s_0, s_1, s_2, s_3, s_4, s_5, s_6, s_7\}$.

Figure 6:
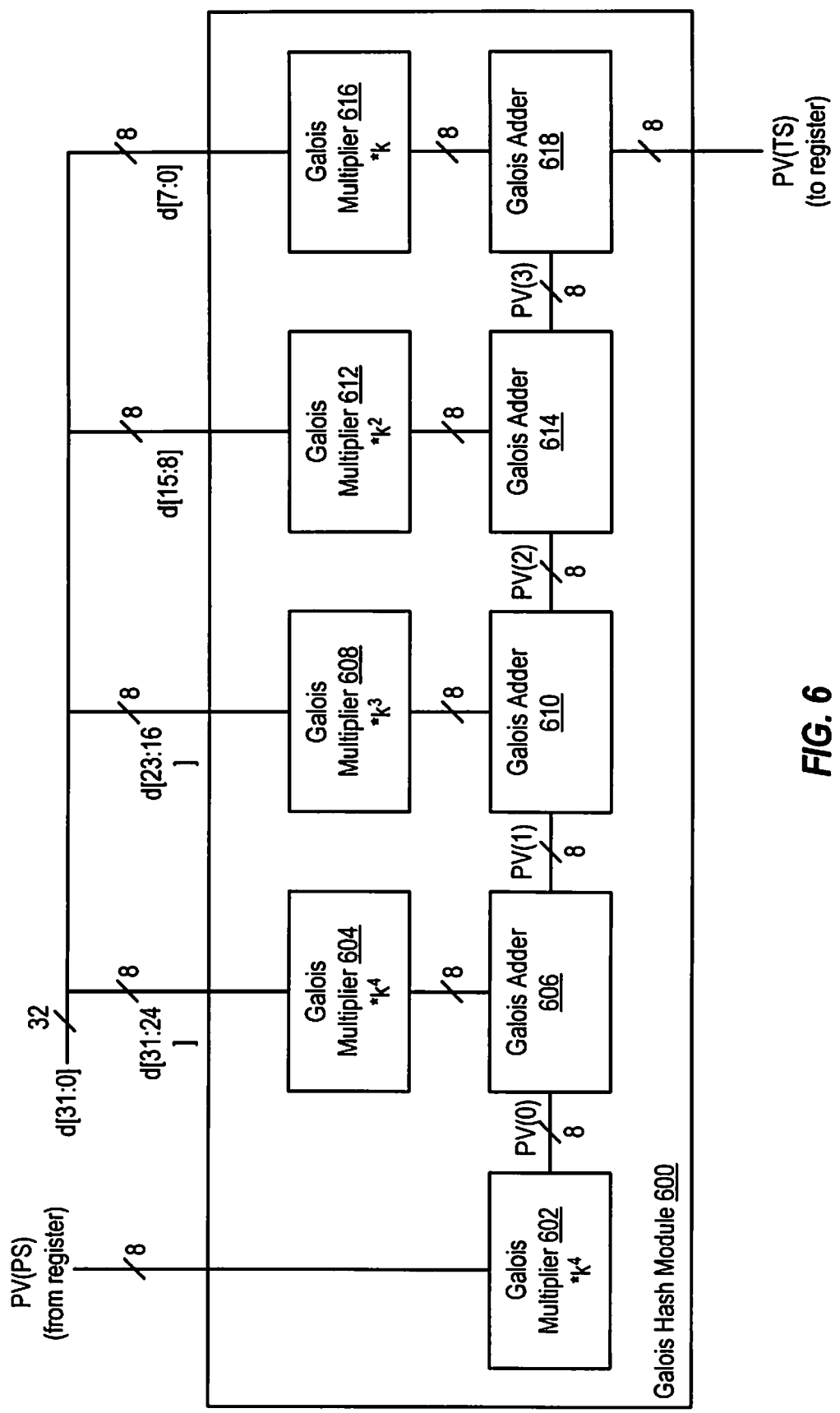
FIG. 6 is a block diagram of a hash stage that can be included within a Galois-based incremental hash module, according to one embodiment of the present invention.

In some embodiments, each Galois hash module within the pipeline can implement the same calculations (e.g., all Galois hash modules in Pipeline 0 can support the calculations performed by the Galois hash module shown in FIG. 6). This can allow certain efficiencies to be realized. For example, certain values can be calculated a single time (e.g., within the first Galois hash module) and provided to all other stages within the pipeline, thus eliminating the need for redundant circuitry. Such efficiencies are described in more detail below with respect to FIG. 6.

In general, the following table indicates the values of d[31:0] during each of cycle 0-cycle m−1 of Pipeline 0 (as used herein, a cycle is defined as the amount of time needed for the Galois hash modules to calculate their respective partial hash values and to provide these partial hash values as stable inputs to the register in the next stage), for the particular substring length, datapath width, and unit size described above:

|  | d[31:24] | d[23:16] | d[15:8] | d[7:0] |
|---|---|---|---|---|
| 0 | $s_0$ | $s_1$ | $s_2$ | $s_3$ |
| 1 | $s_4$ | $s_5$ | $s_6$ | $s_7$ |
| ... | ... | ... | ... | ... |
| i | $s_{4i}$ | $s_{4i+1}$ | $s_{4i+2}$ | $s_{4i+3}$ |
| ... | ... | ... | ... | ... |
| m − 1 | $s_{60}$ | $s_{61}$ | $s_{62}$ | $s_{63}$ |

FIG. 5 shows an example of the second pipeline, Pipeline 1, that can be included in Galois-based incremental hash module 206 of FIGS. 2 and 3. As noted above, once V0 hash been calculated, the hash of substrings at offsets 1, 5, 9, and so on can be calculated based upon V0. Accordingly, instead of implementing a full pipeline like Pipeline 0, Pipeline 1 simply modifies V0. As noted above, Pipeline 1 implements the following equation:

$$V1 = (V0 + s_0 * k^{64} + s_{64}) * k.$$

In this example, multiple registers 302(1,x) are included in Pipeline 1 so that each stage in Pipeline 1 corresponds (with respect to timing) to a stage in Pipeline 0. Accordingly, Pipeline 1 will output the hash of a 64-byte substring 16 cycles after Pipeline 1 begins operation.

As shown by the juxtaposition of FIGS. 4 and 5, registers such as registers 302(1,1) and 302(1,m−1) are used to delay the substring being input to Pipeline 1 in a manner that corresponds to the propagation delay of Pipeline 0. A Galois hash module 304(1,1) is included at some point before the last stage of the pipeline (the particular order of this stage can vary, so long as this stage is included prior to the final stage). Galois hash module 304(1,1) includes a Galois multiplier that is configured to generate the product of the value provided by the register within the same stage (register 302(1,1) in this example) and k64. Galois hash module 304(1,1) then outputs this Galois product to the register (e.g., register 302(1,2) (not shown)) in the next stage of the pipeline.

The final stage of Pipeline 1 includes register 302(1, m−1), a Galois adder, and Galois hash module 304(1, m−1). This stage calculates the Galois sum of V0[7:0], the current d[7:0], and the product generated by Galois hash module 304(1,1). Galois hash module 304(1, m−1) then multiplies the Galois sum by k to generate V1[7:0]. Accordingly, in the 16th cycle, $V1=(V0+s_0*k^{64}+s_{64})*k$ Pipelines 2-3 of FIG. 3 can be implemented similarly to Pipeline 1. In general, each subsequent pipeline Pipeline x (where the first pipeline is Pipeline 0) within a Galois-based incremental hash module can implement the following equation:

$$V_x = (V_{x-1} + s_{x-1} * k^n + s_{n+x-1}) * k.$$

FIG. 6 provides an example of the functionality that can be included within each Galois hash module in Pipeline 0. As shown, a Galois hash module 600 (e.g., one of Galois hash modules 304(0,0), 304(0,1), and 304(0,m) of FIG. 4) receives a partial hash value PV(PS) from a register. PV(PS) represents the partial hash value computed by the previous stage of the pipeline. If Galois hash module 600 is the first hash module in the pipeline, Galois hash module 600 may instead receive a constant value (e.g., 00000000b), or no value at all (e.g., as shown in FIG. 4).

Galois hash module 600 can also receive a constant value k and/or one or more powers of k (e.g., $k^4$, $k^3$, $k^2$, k) (not shown). The value of k can be selected by a user or application and provided to the Galois based incremental hash module in which Galois hash module 600 is included via a user interface, application programming interface, or the like. Calculation of the needed powers of k can be performed within an individual Galois hash module or by another component within the Galois hash module.

Galois hash module 600 is configured to receive PV(PS) from the previous stage and to compute a new partial value, PV(TS). PV(TS) is the partial value computed by the stage of the pipeline that includes Galois hash module 600 (i.e., "this stage"), and this value is output to the register in the next stage of the pipeline. Each partial value is 8 bits long in this example.

Galois hash module 600 also includes several Galois multipliers 602, 604, 608, 612, and 616, as well as several Galois adders 606, 610, 614, and 618. Each Galois multiplier is configured to receive two or more inputs and to generate the Galois product of those inputs. Similarly, each Galois adder is configured to receive two or more inputs and to generate the Galois sum of those inputs.

In this example, Galois hash module 600 generates five partial hash values, PV0-PV(4), according to the following equations. PV(0)-PV(4) are each 8-bits wide in this example.

$$PV(0)=PV(PS)*k^4 \qquad \text{Eq. 5}$$

$$PV(1)=PV(0)+d[31:24]*k^4 \qquad \text{Eq. 6}$$

$$PV(2)=PV(1)+d[23:16]*k^3 \qquad \text{Eq. 7}$$

$$PV(3)=PV(2)+d[15:8]*k^2 \qquad \text{Eq. 8}$$

$$PV(TS)=PV(4)=PV3+d[7:0]*k \qquad \text{Eq. 9}$$

In Galois hash module 600, PV(0) is generated by Galois multiplier 602. As indicated in FIG. 6, Galois multiplier 602 multiplies PV(PS) by $k^4$ to generate PV(0).

Galois multiplier 604 multiplies d[31:24] by $k^4$. The output of Galois multiplier 604 is provided to Galois adder 606, which also receives PV(0) from Galois multiplier 602. Galois adder 606 sums these two inputs to generate PV(1).

Galois multiplier 608 multiplies d[23:16] by $k^3$. The output of Galois multiplier 608 is provided to Galois adder 610, which also receives PV(1) from Galois adder 606. Galois adder 610 sums these two inputs to generate PV(2).

Galois multiplier 612 multiplies d[15:8] by $k^2$. The output of Galois multiplier 612 is provided to Galois adder 614, which also receives PV(2) from Galois adder 610. Galois adder 614 sums these two inputs to generate PV(3).

Galois multiplier 616 multiplies d[7:0] by k. The output of Galois multiplier 616 is provided to Galois adder 618, which also receives PV(3) from Galois adder 614. Galois adder 618 sums these two inputs to generate PV(4).

It is noted that the number of multipliers and adders within a Galois hash module can vary based upon the datapath width of the pipeline in which that Galois hash module is included. In the illustrated example, the datapath width is four, and thus four pairs of multipliers and adders are used, in addition to Galois multiplier 602. If the datapath width is instead three, such that the input to the Galois hash module is d[23:0], Galois multiplier 604 and Galois adder 606 can be eliminated. Similarly, if the datapath width is increased to five, another Galois multiplier (to multiply d[39:32] by $k^5$) and another Galois adder (to product the Galois sum of the product of the new adder and the output of Galois multiplier 602) can be added. Accordingly, the functionality included within a Galois hash module can vary depending upon the datapath width of the pipeline.

If Galois hash module 600 is in the first stage of Pipeline 0 of FIG. 4, in cycle 0 (i.e., the cycle in which d[31:0] equals substring $\{s_0, s_1, s_2, s_3\}$), Galois hash module 600 will generate the following partial hash values:

$$PV(0)=0,$$

$$PV(1)=s_0*k^4,$$

$$PV(2)=s_0*k^4+s_1*k^3,$$

$$PV(3)=s_0*k^4+s_1*k^3+s_2*k^2,$$

$$PV(TS)=PV(4)=s_0*k^4+s_1*k^3+s_2*k^2+s_3*k.$$

If instead Galois hash module 600 is in the second stage of Pipeline 0 of FIG. 4, Galois hash module 600 will generate the following partial hash values in cycle 1 (i.e., the cycle in which d[31:0] equals substring $\{s_4, s_5, s_6, s_7\}$):

$$PV(0)=s_0*k^8+s_1*k^7+s_2*k^6+s_3*k^5,$$

$$PV(1)=s_0*k^8+s_1*k^7+s_2*k^6+s_3*k^5+s_4*k^4,$$

$$PV(2)=s_0*k^8+s_1*k^7+s_2*k^6+s_3*k^5+s_4*k^4+s_5*k^3,$$

$$PV(3)=s_0*k^8+s_1*k^7+s_2*k^6+s_3*k^5+s_4*k^4+s_5*k^3+s_6*k^2,$$

$$PV(TS)=PV(4)=s_0*k^8+s_1*k^7+s_2*k^6+s_3*k^5+s_4*k^4+s_5*k^3+s_6*k^2+s_7*k.$$

Accordingly, the same hardware can be used to implement different stages of the Galois-based incremental hash pipeline.

In order to increase efficiency (e.g., in terms of the area consumed by a hardware implementation of Galois hash module 600), certain values calculated by one Galois hash module in the pipeline can be provided to other Galois hash modules. For example, if each Galois hash module is implementing the same equations (e.g., Equations 6-9 above) and if each Galois hash module receives a single power of k (as opposed to also receive all of the powers of k), each Galois hash module will need to calculate $k^4$, $k^3$, and $k^2$. Instead of duplicating the functionality for generating these powers of k within all Galois hash modules in the pipeline, a single hash module can calculate these values and provide the values to each other Galois hash module within the pipeline. Alternatively, the Galois-based incremental hash module can pre-compute these values and provide the precomputed powers of k to each Galois hash module within the Galois-based incremental hash module, as needed.

Similarly, each Galois hash module 600 will be calculating the same products of an input $s_i$ and a respective power of k. For example, in Cycle 0, each Galois hash module within Pipeline 0 calculates the Galois product of d[31:24] and $k^4$. Accordingly, instead of providing redundant circuitry within each Galois hash module to perform this calculation, a single Galois hash module can perform this calculation and provide the result to all of the other Galois hash modules that will use the result. For example, the first Galois hash module in Pipeline 0 can include Galois multiplier 604; all subsequent Galois hash modules within Pipeline 0 can omit this multiplier and simply receive the product calculated by Galois multiplier 604 from the first Galois hash module. The functionality of Galois multipliers 608, 612, and 616 can similarly be reduced. Accordingly, one Galois hash module can provide both a partial hash value and a Galois product of a portion of the input stream and a power of k to another Galois hash module.

The Galois adders included in Galois hash module 600 (and in other locations within a Galois-based incremental hash module) operate by performing a bitwise exclusive-OR (XOR) on the inputs received. For example, if two binary values 0010010 and 0110111 are input to a Galois adder, the Galois adder will output 0100101.

The Galois multipliers can, in one embodiment, operate as follows when performing Galois multiplication within a Galois field $GF(2^w)$, where w is the number of bits per unit within the input stream. Each Galois multiplier generates a product $Z=X*Y$, where Z, X, and Y are each elements in $GF(2^w)$ and are each represented as a bit-vector of w bits. For example, $X=\{X_{w-1}, X_{w-2}, \ldots, X_3, X_2, X_1, X_0\}$, and each $X_i$ is a binary value (i.e., either "0" or "1"). The irreducible polynomial for this $GF(2^w)$ field is defined as $R=\{R_{w-1}, R_{w-2}, \ldots, R_3, R_2, R_1, R_0\}$, where each $R_i$ is a coefficient of the irreducible polynomial. An algorithm to compute Z is:

```
Z <= 0, V <= X
for i =(w-1) to 0 do
    if Y_i = 1 then
        Z <=Z ^ V
    end if
    if V_(w-1) = 0 then
        V <= V << 1
    else
        V <= (V << 1) ^ R
    end if
end for
return Z.
```

Irreducible polynomials having a smaller number of non-zero coefficients are preferred in at least some implementations.

In some embodiments, a Galois-based incremental hash module, such as that shown in FIG. 3, can provide one or more advantages over conventional incremental hash modules. In particular, such a hash module is efficient in terms of both computation required and area consumed for implementation, due to the nature of the Galois operations involved. For example, within Pipeline 0 if the powers of k used by each Galois hash module are precomputed and stored, and if the multiplication operations shown in Equations 6-9 are only performed once in a single Galois hash module, the number of multipliers needed for Pipeline 0 is four (the number of Galois multipliers needed in the first Galois hash module to calculate the products of each $s_i$ and a respective power of k) plus 16 (the number of stages) times one (the number of multipliers needed to compute the product of PV(PS) and $k^4$ in each Galois hash module), which equals 20 Galois multipliers. Furthermore, as shown in FIG. 5, the subsequent pipelines only need two multipliers each, leading to a total of 26 Galois multipliers. If each Galois multiplier requires approximately 96 (XOR+AND), the total cost of Galois multiplication within Galois-based incremental hash module 206 will be about 2400 (XOR+AND), or 9.6 K gates total.

Additionally, as described above, such a Galois-based incremental hash module allows the current hash function to be modified on-the-fly by simply modifying the value of k. Furthermore, the hash values generated by a Galois-based hash module tend to be uniform and generally universal.

Most applications require hash functions to distribute hash values evenly, or uniformly. A Galois-based hash module that implements Equation 1 (as provided above) will provide a uniform hash value distribution for non-zero k, as illustrated herein. By way of example, assume such a Galois-based hash module receives an L-bit input string and calculates hashes into the $GF(2^w)$ space. For a uniform hash, the number of distinct input strings which hash to the same value should be $2^L/2^w=2^{(L-w)}$.

Assume two input strings X and Y have the same hash value V:

$$V=H(X)=x_0*k^n+x_1*k^{(n-1)}+ \ldots X_{n-3}*k^3+x_{n-2}*k^2+x_{n-1}*k$$

$$V=H(Y)=y_0*k^n+y_1*k^{(n-1)}+ \ldots +y_{n-3}*k^3+y_{n-2}*k^2+y_{n-1}*k$$

Each $x_i$, $y_i$ except the last one is a w-bit variable. As noted above, the final unit of data in each substring, $x_{n-1}$ and $y_{n-1}$, can be right-padded with a fixed value if the final unit contains fewer than w bits.

Now define $R=X+Y$, such that R is the Galois sum of X and Y. Accordingly, H(R) will be equal to the Galois sum of H(X) and H(Y). Thus, $H(R)=V+V=0$.

The number of R for which $H(R)=0$ is equal to number of distinct strings which hash to the same value. H(R) can be expressed as:

$$H(R)=r_0*k^n+r_1*k^{(n-1)}+ \ldots +r_{n-3}*k^3+r_{n-2}*k^2+r_{n-1}k=0 \mod p.$$

If k is not zero, k has a multiplicative inverse q. Multiplying $q^n$ to both sides of above equation results in:

$$r_0+r_1 q+r_2*q^2+ \ldots +r_{n-2}*q^{(n-2)}+r_{n-1}*q^{(n-1)}=0 \mod p,$$
and $$r_0=(r_1 q+r_2*q^2+ \ldots +r_{n-2}*q^{(n-2)}+r_{n-1}*q^{(n-1)}) \mod p.$$

Based on the above equations, for any combination of $\{r_1, r_2, \ldots, r_{n-1}\}$, there exists one and only one $r_0$, which satisfies $H(R)=0$. The total number of distinct $\{r_1, r_2, \ldots, r_{n-1}\}$ is $2^{(L-w)}$, which is accordingly also the number of distinct strings that hash into same value. Therefore, Equation 1 defines a uniform hash.

Figure 7:
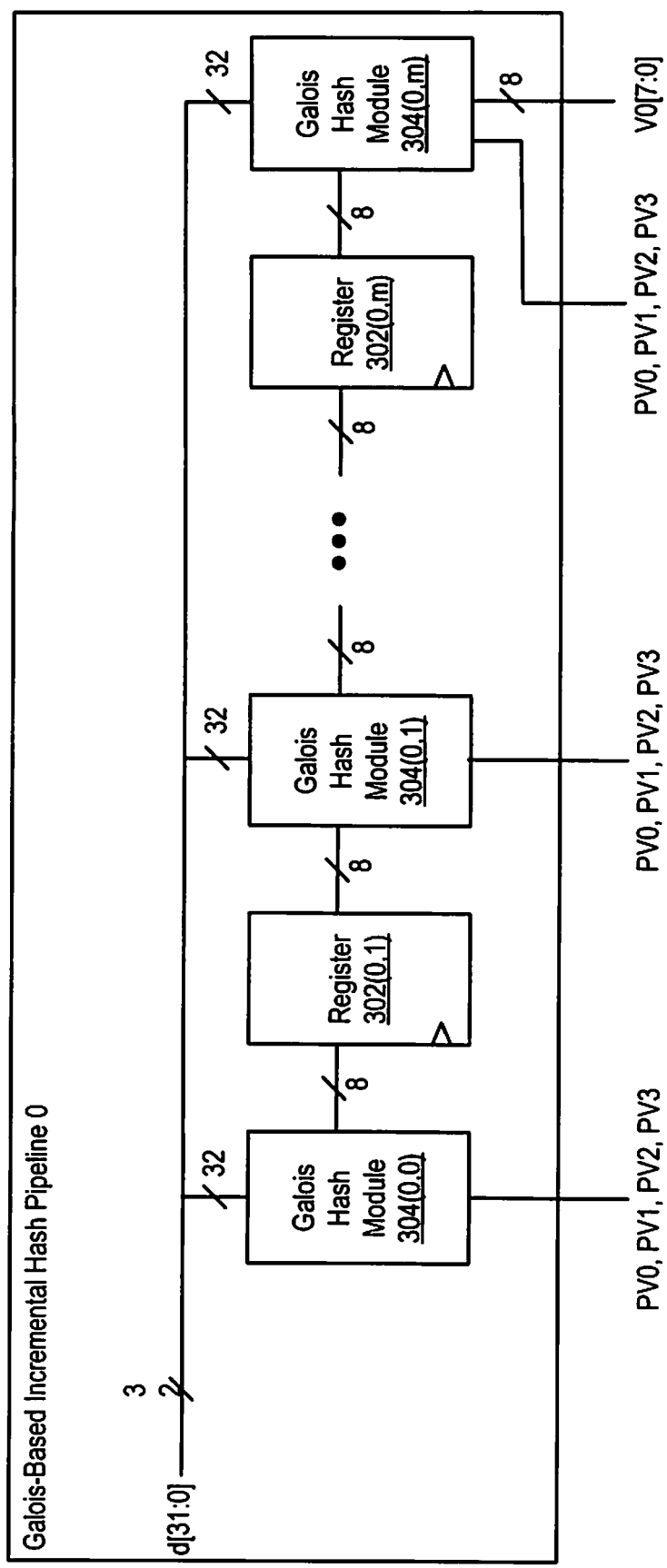
FIG. 7 is a block diagram of a tapped pipeline that can be included within a Galois-based incremental hash module, according to one embodiment of the present invention.

FIG. 7 is a block diagram of a tapped pipeline that can be included within a Galois-based incremental hash module. Since the full computation pipeline (Pipeline 0 in the examples included within this application) is systolic, intermediate results can be tapped out, and each tap is equivalent to hash value of a shorter string. This allows hashes of different lengths of substrings to share one set of hash functions. For a 64-byte pipeline, the maximum number of taps is 63, and each tap gives a hashed value for a substring with length from 1 to 63 bytes. For example, the pipeline of FIG. 7 is identical to Pipeline 0 of FIG. 4, except that each Galois hash module provides the partial hash values PV0-PV3 calculated by that Galois hash module at a tapped output.

While the examples of FIGS. 4-7 have focused on specific examples of Galois-based incremental hash modules, it is noted that similar pipelines and hash modules can be used in other embodiments. For example, similar pipelines and hash modules can be used to implement similar Galois-based incremental hash modules that operate in systems having one or more different parameters (e.g., w, n, and datapath width) than the system shown in FIGS. 4-7.

Furthermore, in the above examples, an 8-bit hash value is derived. To obtain a 16-bit hash value, two of the above-described Galois-based incremental hash modules, each using a different value k, can be employed. The resulting 8-bit hashes can be concatenated to produce a 16-bit hash.

Figure 8:
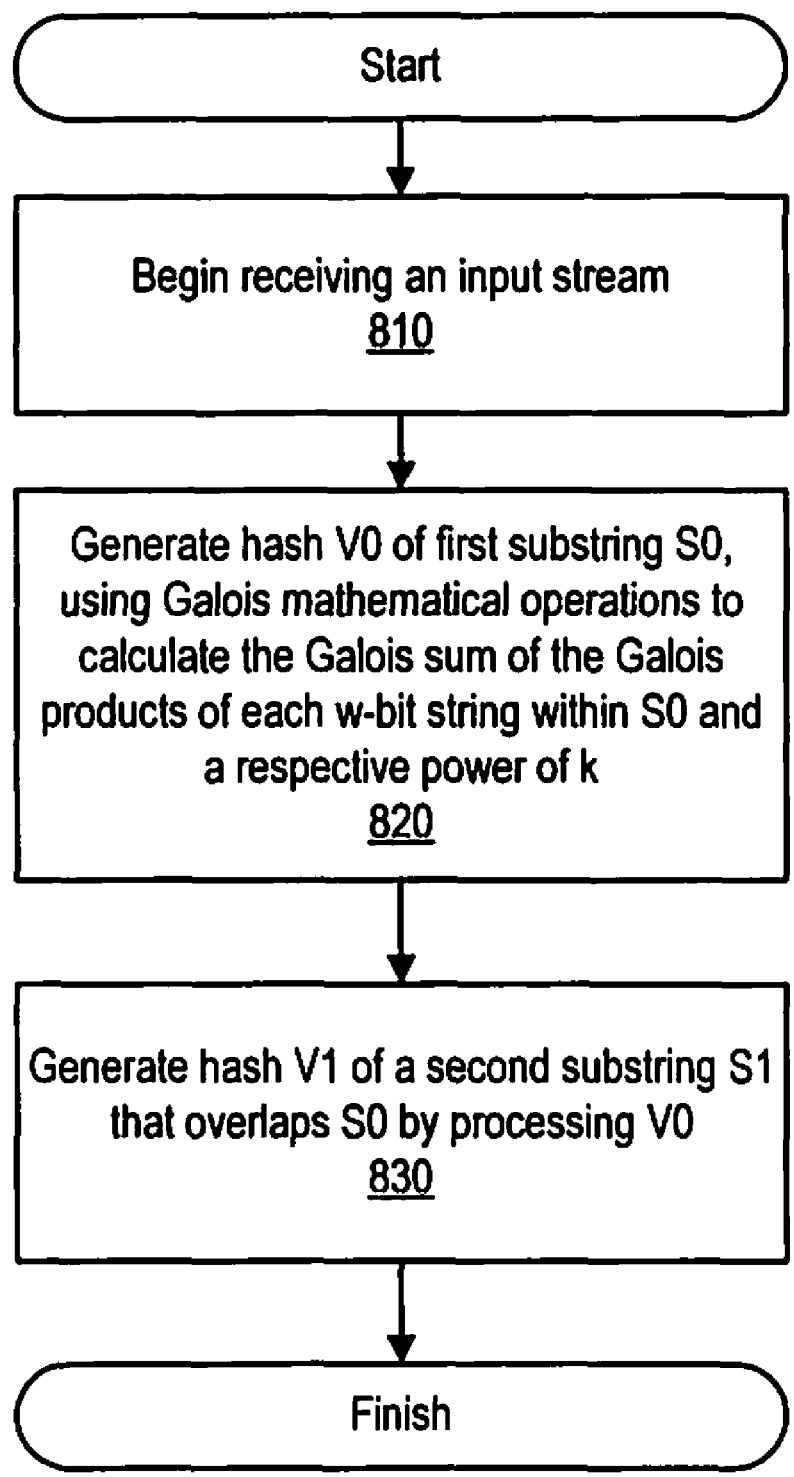
FIG. 8 is a flowchart of a method of calculating a Galois-based incremental hash, according to one embodiment of the present invention.

FIG. 8 is a flowchart of a method of calculating a Galois-based incremental hash. This method can be performed by a Galois-based incremental hash module such as module 206 of FIGS. 2 and 3. Such a Galois-based incremental hash module can be implemented in hardware, software, or a combination of both hardware and software.

The method begins at 810, when the Galois-based incremental hash module begins receiving an input stream. The stream can be received directly from an interface; alternatively, the input stream can be received from a buffer or other temporary storage device. In some embodiments, the Galois-based incremental hash module continues to receive the input stream throughout the performance of the method (as opposed to receiving all of the input stream before proceeding to the next operation in the method).

The Galois-based incremental hash module then generates a hash V0 of a first substring S0 within the input stream, as shown at 820. Generation of V0 involves using Galois mathematical operations to calculate the Galois sum of a series of Galois products. Each Galois product is the product of a different w-bit string within S0 and a respective power of a non-zero constant k.

The Galois-based incremental hash module then generates a second hash V1 of a second substring S1 within the input stream, as shown at 830. S1 overlaps S0. Accordingly, Galois-based incremental hash module can generate V1 by processing V0. For example, Galois-based incremental hash module can calculate the hash of each w-bit substring that is included in one but not both S0 and S1 and then combine those hashes with V0 (e.g., using one of Equations 2-4 above).

Figure 9:
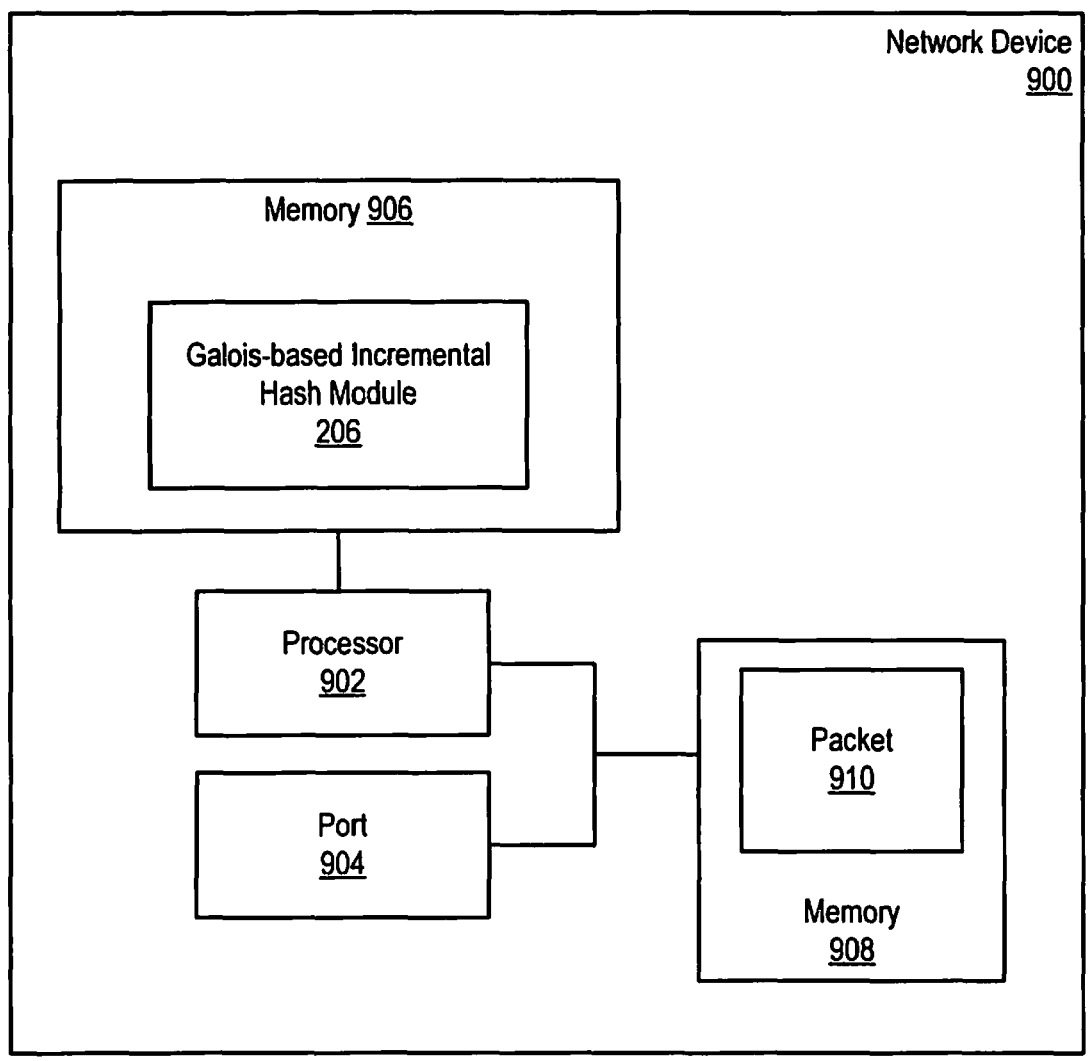
FIG. 9 is a block diagram illustrating how at least a portion of the Galois-based hash module can be implemented in software, according to one embodiment of the present invention.

FIG. 9 is a block diagram illustrating how at least a portion of the Galois-based hash module can be implemented in software. FIG. 9 shows a network device (e.g., a router, switch, bridge, or the like). As illustrated, network device 900 includes one or more processors 902 (e.g., microprocessors, PLDs (Programmable Logic Devices), or ASICs (Application Specific Integrated Circuits)) configured to execute program instructions stored in memories 906 and/or 908. Memories 906 and 908 can include various types of RAM (Random Access Memory), ROM (Read Only Memory), Flash memory, MEMS (Micro Electro-Mechanical Systems) memory, and the like. Network device 900 also includes one or more ports 904 (e.g., one or more hardware ports or other network interfaces that can be linked to other network devices, hosts, servers, storage devices, or the like). Processor 902, port 904, and memories 906 and 908 are coupled to send and receive data and control signals by one or more buses or other interconnects.

In this example, program instructions executable to implement Galois-based incremental hash module 206 are stored in memory 906. A packet 910 that has been received via port 904 can be stored in memory 908 for processing by Galois-based incremental hash module 206.

It is noted that the program instructions and/or data executable to implement Galois-based incremental hash module 206 can be stored on various computer readable media such as a memory (e.g., RAM (Random Access Memory)). In some embodiments, such software is stored on a computer readable medium such as a CD (Compact Disc), DVD (Digital Versatile Disc), hard disk, optical disk, tape device, floppy disk, and the like). In order be executed, the software is loaded into memory from another computer readable medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
computing a first hash of a first string of an input stream, wherein the computing the first hash comprises performing a Galois field mathematical operation;
computing a second hash of a second string of the input stream, wherein the second string overlaps the first string, and the computing the second hash comprises processing the first hash.

2. The method of claim 1, further comprising:
modifying a value of a constant k, wherein k is a non-zero number both before and after being modified, and wherein modifying the value of k creates a new hash equation to be used when calculating a hash of a string within the input stream.

3. The method of claim 2, wherein the value of k is modified in response to detecting one or more collisions.

4. The method of claim 2, wherein the modifying the value of k does not cause a pipeline performing the computing the first hash to be flushed, and wherein the modifying the value of k is performed while the computing the first hash is still being performed.

5. The method of claim 1, further comprising providing an output from a Galois hash module in the middle of a pipeline to a hash consumer outside of the pipeline, while the pipeline performs the computing the first hash, wherein the output is a third hash of a first substring of the first string of the input stream.

6. The method of claim 1, wherein all mathematical operations performed to compute the first hash are Galois field operations, wherein the first hash is a w-bit hash, and wherein each w-bit substring within the first string is multiplied by a respective power of a non-zero constant k.

7. The method of claim 1, wherein the computing the first hash comprises inputting the first string S to a hash function H(S), wherein $S=\{s_0, s_1, \ldots s_{n-2}, s_{n-1}\}$, wherein each $s_i$ in S comprises w consecutive bits, wherein $H(S)=s_0*k^n + \ldots + s_{n-3}*k^2 + s_{n-2}*k^2 + s_{n-1}*k$, wherein each multiplication and addition in H(S) is a Galois field operation, and wherein k is a w-bit non-zero number.

8. The method of claim 7, further comprising right-padding $s_{n-1}$ with fixed values, if $s_{n-1}$ has fewer than w bits.

9. The method of claim 7, further comprising precomputing each of the n powers of k.

10. The method of claim 1, wherein the computing the first hash comprises forwarding, from a first hash module within a pipeline, a partial hash value and a product to a second hash module within the pipeline, wherein the product is the product of a portion of the first string and a power of k, and wherein the partial hash value is computed by the first hash module and consumed by the second hash module.

11. A system comprising:
a Galois-based incremental hash module configured to implement an incremental hash function,
wherein the Galois-based incremental hash module comprises a first pipeline and a second pipeline coupled to the first pipeline,
wherein the first pipeline is configured to perform one or more Galois field mathematical operations in order to compute a first hash of a first string of an input stream,
wherein the second pipeline is configured to process the first hash in order to compute a second hash of a second string of the input stream, and
wherein the second string overlaps the first string.

12. The system of claim 11, wherein the Galois-based incremental hash module is configured to modify a value of a constant k, wherein k is a non-zero number both before and after being modified, and wherein modifying the value of k creates a new hash equation to be implemented by one of the first pipeline and the second pipeline.

13. The system of claim 12, wherein the Galois-based incremental hash module is configured to modify the value of k is modified in response to detecting one or more collisions.

14. The system of claim 12, wherein modifying the value of k does not cause the first pipeline to be flushed, and wherein the value of k is modified while the first pipeline is computing the first hash.

15. The system of claim 11, wherein the first pipeline comprises a Galois hash module configured to provide a partial hash value to a hash consumer outside of the first pipeline, while the first pipeline computes the first hash, wherein the partial hash value is a third hash of a first substring of the first string of the input stream.

16. The system of claim 11, wherein all mathematical operations performed to compute the first hash are Galois field operations, wherein the first hash is a w-bit hash, and wherein the first pipeline is configured to multiply each w-bit substring within the first string by a respective power of a non-zero constant k.

17. The system of claim 11, wherein the first pipeline is configured to input the first string S to a hash function H(S), wherein $S=\{s_0, s_1, \ldots s_{n-2}, S_{n-1}\}$, wherein each $s_i$ in S comprises w consecutive bits, wherein $H(S)=s_0*k^n + \ldots + s_{n-3}*k^3 + s_{n-2}*k^2 \, s_{n-1}*k$, wherein each multiplication and addition in H(S) is a Galois field operation, and wherein k is a w-bit non-zero number.

18. The system of claim 17, wherein the Galois-based incremental hash module is configured to precompute each of the n powers of k.

19. The system of claim 11, wherein the first pipeline comprises a first hash module and a second hash module, wherein the first hash module is configured to forward a partial hash value and a product to the second hash module, wherein the product is the product of a portion of the first string and a power of k, and wherein the partial hash value is computed by the first hash module and consumed by the second hash module.

20. A system comprising:
means for computing a first hash of a first string of an input stream, wherein computing the first hash comprises performing a Galois field mathematical operation;
means for computing a second hash of a second string of the input stream, wherein
the second string overlaps the first string, and
computing the second hash comprises processing the first hash.

* * * * *